United States Patent [19]
Lee

[11] Patent Number: 5,924,213
[45] Date of Patent: Jul. 20, 1999

[54] CONSTRUCTION MATERIAL BEARING NUMERICAL MEASUREMENT INDICIA THEREON

[76] Inventor: Baek Woo Lee, 80-15 41$^{st}$ Ave., Elmhurst, N.Y. 11373

[21] Appl. No.: 08/944,046

[22] Filed: Sep. 8, 1997

[51] Int. Cl.$^6$ .................................................. G01B 3/00
[52] U.S. Cl. ................................. 33/494; 33/1 B; 52/105
[58] Field of Search .................................. 33/1 B, 1 BB, 33/1 G, 494, 562, 563, 679.1, 566; 52/105

[56] References Cited

U.S. PATENT DOCUMENTS

| | | | |
|---|---|---|---|
| 4,301,596 | 11/1981 | Sedlock | 33/494 |
| 4,779,346 | 10/1988 | Schafer | 33/494 |
| 4,858,402 | 8/1989 | Putz | 52/105 |
| 4,870,799 | 10/1989 | Hassan | 52/105 |
| 4,927,696 | 5/1990 | Berg | 52/105 |
| 5,282,317 | 2/1994 | Carter et al. | 33/1 B |
| 5,673,489 | 10/1997 | Robell | 33/1 B |

FOREIGN PATENT DOCUMENTS

| | | | |
|---|---|---|---|
| 685455 | 4/1964 | Canada | 52/105 |
| 529509 | 6/1955 | Italy | 33/1 B |

*Primary Examiner*—G. Bradley Bennett
*Attorney, Agent, or Firm*—Bierman, Muserlian and Lucas

[57] ABSTRACT

The numerical measurement indicia is placed along the width and length of sheet material like plywood or drywall to aid in cutting and nailing to the frame. The linear construction material also contains numerical measurement indicia in a lengthwise direction to assist in cutting and affixing to other structures.

5 Claims, 2 Drawing Sheets

CONSTRUCTION MATERIAL BEARING NUMERICAL MEASUREMENT INDICIA THEREON

BACKGROUND

1. Field of the Invention

This invention relates to construction material and especially to linear construction materials used to build a frame for a building and to sheet construction material which is attached to the frame built from the linear construction material.

2. Description of the Prior Art

Construction materials are provided in both linear form and sheet form. Examples of linear forms of construction material include studs of varying length, such as 1×2 s, 1×4 s, 1×6 s, 1×8 s, 1×10 s, 1×12 s, 2×4 s, 2×6 s, 2×8 s, 2×10 s, 2×12 s, the first number indicating thickness and the second number indicating width of the linear piece in inches. The studs are normally 8 to 24 feet in length. Sheet construction material comes in sheets which are typically 4'×8', 4×10', 4×12', 4×16', the first number indicating width and the second number the length of the sheet. Sheet construction material typically varies in thickness from ⅛" to 1". Typical linear construction material is made of wood or metal while typical sheet construction material is made of wood or inorganic materials. Examples of sheet construction material includes plywood sheets, drywall, sheetrock and plasterboard.

Construction materials are made in predetermined dimension. Architectural plans, however, generally do not account for the predetermined dimensions of the construction material. This means that construction material must be cut to the correct size. Furthermore, when affixing sheet construction material to a frame, it is imperative to know where the frame or stud in the building is located. Thus, tools for measuring and drawing straight lines are essential tools at a construction site.

For example, with sheet construction material, the stud lines are marked every 16 inches on the sheeting materials so that there are exact spots to nail the sheeting materials to the studs. Each end of the sheeting material needs to be marked every 16 inches on top and the bottom so that a straight line can be drawn between the two marks. A level or any straight edge is used to connect the two points. This process of marking sheet material with stud lines is time consuming. It can also be dangerous because the measurements are often made after tacking the sheeting material to the frame. Thus, a carpenter is often working in dangerous areas while trying to draw stud lines. For example, on a roof or a ceiling. As should be appreciated, working on a ceiling is very dangerous if the sheet is not securely affixed to the frame since a worker is usually directly under the sheet material.

Another area that presents a problem is cutting of construction material. The carpenter needs to measure once at the top of the sheet and once at the bottom of the sheet. This is done so that the carpenter has two reference points to draw a straight line.

Other time-consuming areas that the carpenter may face are cut out areas, such as windows, doors, plumbing pipes, vents, and electrical outlets. This is time consuming given the fact that several measurements have to be made numerous times. When cutting out these areas, a carpenter needs to make sure that these cut out areas are "square" (level).

Another problem exists in placement of nails. There are no indications on how far apart the nails or screws need to be placed on the sheeting materials when affixing it to a frame. A carpenter normally uses his/her judgment and eyesight to place the nails or screws. It would take too long to measure nailing spots. In result, the weight of the sheeting materials is often not distributed evenly.

Also, in dry wall installation, if the screw misses the stud, it is backed out. Backing the screw out leaves a hole which must be filled in later. Filling in holes takes time and is costly and should be avoided, if possible.

SUMMARY OF THE INVENTION

Applicants have now solved a number of the problems referred to above by placing linear lengthwise numerical measurement indicia on the construction material. Preferably, linear lengthwise numerical measurement indicia is placed along opposing edges on one side of the construction material and widthwise line indicia connects the one linear lengthwise numerical measurement indicia to the other linear lengthwise numerical measurement indicia on the one side of the construction material.

In sheet construction material, it is preferred to employ linear widthwise numerical measurement indicia along one side and preferably both edges of the sheet material on the same side of the sheet material that the linear lengthwise numerical measurement indicia appear. It is also preferred to employ lengthwise lines indicia to connect the two linear widthwise numerical measurements indicia. By employing both lengthwise line indicia and widthwise line indicia, a grid is formed on one side of the sheet construction material.

The use of such indicia eliminates the need for a tape measure and a straight edge for drawing lines on the sheet construction material and the linear construction material, thereby easing placement of nails and cutting of the construction material.

Because many steps are already completed in a single moment, the present invention will dramatically reduce the amount of time to complete a project. Another special quality of the present invention is that it will greatly help the level of productivity and reduce labor cost.

More specifically, the construction material of the present invention may have one or more of the following preferred embodiments:

1) 16 inch stud line indicia (horizontally and vertically) is provided on the construction material.
2) Linear measurement indicia is provided on all four sides of the sheet construction material. Each side of the sheeting material is provided with linear numerical measurement indicia that has two separate numerical measurements, ascending and descending. Ascending and descending numerical measurements are provided next to each other. These measurements are marked by quarter inch, half inch, inch, and feet. All of these measurements are connected by lines. For an example, one inch mark on the right side is connected to one inch mark on the left side by a line indicia.
3) Stud line numerical measurement indicia is also provided on every stud line. The stud line numerical measurement indicia is preferably provided in ascending and descending order so that it can be easily read. This minimizes mistakes when a carpenter has to deal with large measurements because of the big span of areas.
4) Along stud line point indicia demarking every four inches for designated nail spots.
5) Also, within every 16 inch by 16 inch square area, the center point, 8 inch, bears point indicia to mark the spot. This point is not a nail spot but a reference spot for the user's eye.

6) From that center point, indicia, point indicia marking 4 inch marks are demarked top left side, top right side, left bottom side, and right bottom side of the center point for quick reference points.
7) Also where stud lines intersect (vertical and horizontal), point indicia is present to highlight the intersection.

The advantages of the present invention include a quick reference point for nails or screws thereby allowing the weight of the sheeting material to be distributed evenly. The present invention also avoids the need to rely on eyesight and judgment for placement of nails or screws on the sheet construction materials. The present invention also allows for sheet construction material to be nailed simply due to highlighted nail reference point indicia. Additionally, less tools are needed, e.g. no square or ruler, and the present invention provides a safer working condition because there is no need to make measurements when on a ladder or in other precarious spots. Furthermore, this does not break the rhythm of the worker, in that he need not stop to mark stud lines.

BRIEF DESCRIPTION OF THE DRAWINGS

These and other aspects of the present invention may be more readily understood by reference to one or more of the following drawings.

DETAILED DESCRIPTION OF THE INVENTION

Figure 1:
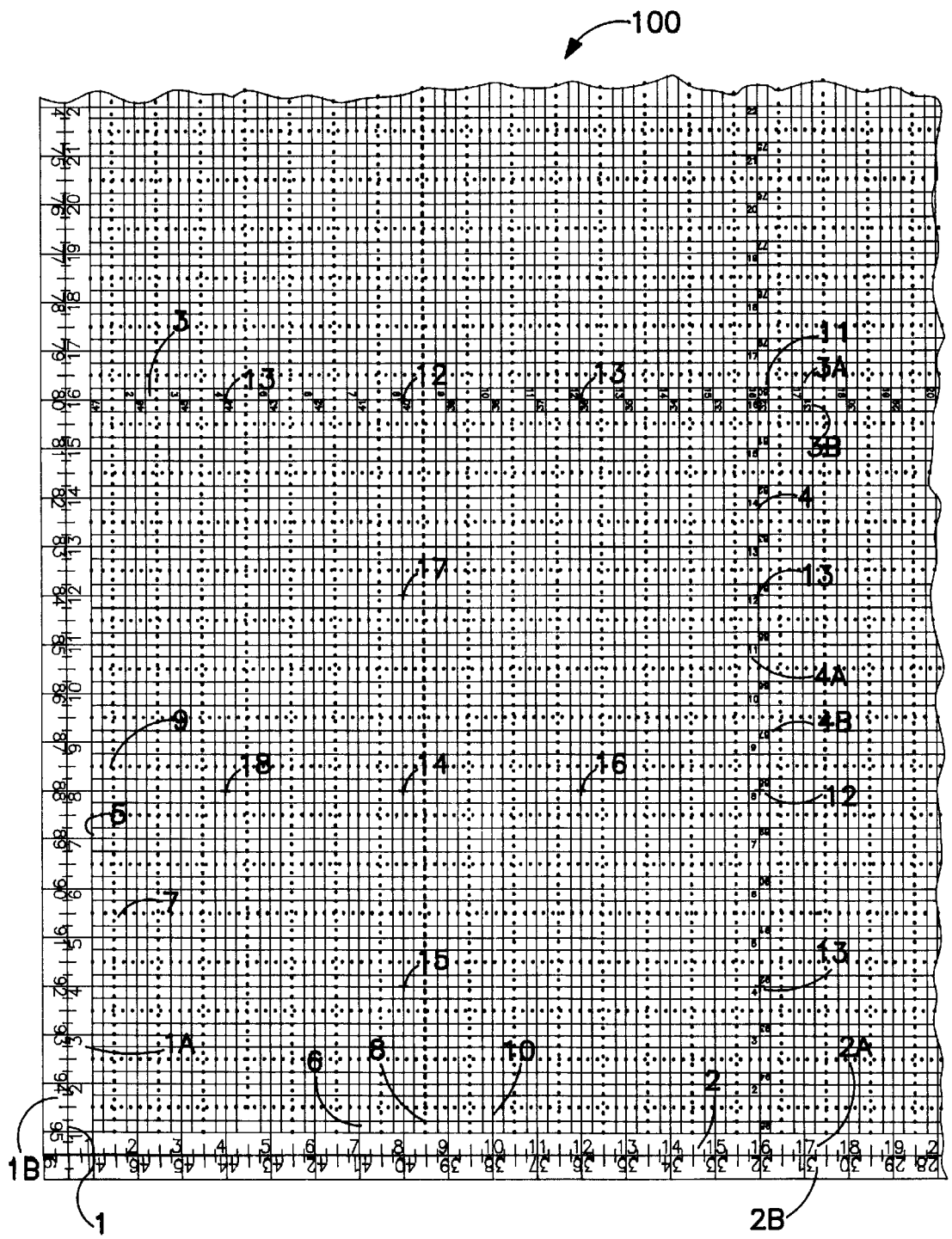
FIG. 1 illustrates sheet construction material bearing linear lengthwise and widthwise numerical measurement indicia and a grid of lengthwise and widthwise line indicia thereon.

FIG. 1 illustrates sheet construction material 100 bearing linear lengthwise numerical measurement indicia 1. On one side of linear lengthwise numerical measurement indicia 1 is linear lengthwise ascending numerical measurement indicia 1A and on the other side is linear lengthwise descending numerical measurement indicia 1B. Indicia 1, 1A and 1B run the entire length of sheet construction material.

Along the width of sheet construction material 100 is linear widthwise numerical measurement indicia 2 which has linear widthwise ascending numerical measurement indicia 2A and linear widthwise descending numerical indicia 2B.

At each 16 inch interval along linear lengthwise numerical measurement indicia 1 is stud line widthwise indicia 3 which has stud line widthwise ascending numerical measurement indicia 3A and stud line widthwise descending numerical measurement indicia 3B.

At each 16 inch interval along linear widthwise numerical measurement indicia is stud line lengthwise indicia 4 which has stud line lengthwise ascending numerical measurement indicia 4A and stud line lengthwise descending numerical measurement indicia 4B.

It should be appreciated that opposite edges of sheet construction material 100 on the same side of sheet 100 is another mirror image indicia of both linear lengthwise numerical measurement indicia 1 and linear widthwise numerical measurement indicia 2 where the stud lines indicia 3 and 4 terminate respectively.

One inch line widthwise indicia 5 and one inch line lengthwise indicia 6 are also marked along with half inch line widthwise indicia 7, half inch line lengthwise indicia 8, quarter inch line widthwise indicia 9, and quarter inch line lengthwise indicia 10. Preferably, stud line indicia 3 and 4 and one inch line indicia 5 and 6 are contiguous with the linear indicia 1 and 2 respectively while both the half inch line indicia 7 and 8 and quarter inch line indicia 9 and 10 are not. It is also preferred that half inch line indicia 7 and 8 are dotted while quarter inch line indicia 9 and 10 are not as bold in appearance as stud line indicia 3 and 4 and one inch line indicia 5 and 6.

Stud lines intersecting point indicia 11 mark the intersection of stud line widthwise indicia 3 and stud line lengthwise indicia 4.

Along each stud line indicia 3 and 4 are eight inch stud line point indicia 12 and four inch stud line point indicia 13.

Preferably, each square delimited by stud line indicia bears stud line square center point indicia 14. Stud line square center point indicia 14 is preferably marked as a bold cross as shown in FIG. 1.

It is also preferred that within each square delimited by the stud line indicia that stud line square 8×4 point indicia 15, stud line square 12×8 point indicia 16, stud line square 8×12 point indicia 17 and stud line square 4×12 point indicia 18. Preferably, these points are clearly visible.

The grid indicia on the sheet construction material is comprised of the various line indicia that is both widthwise and lengthwise on the same side of sheet construction material 100. Specifically, as illustrated in FIG. 1, the grid comprises:

Stud line widthwise indicia 3
Stud line lengthwise indicia 4
One inch line widthwise indicia 5
One inch line lengthwise indicia 6
Half inch line widthwise indicia 7
Half inch line lengthwise indicia 8
Quarter inch line widthwise indicia 9
Quarter inch line lengthwise indicia 10.
Point indicia 12, 13, 14, 15, 16, 17 and 18 are marked on the grid.

Figure 2:
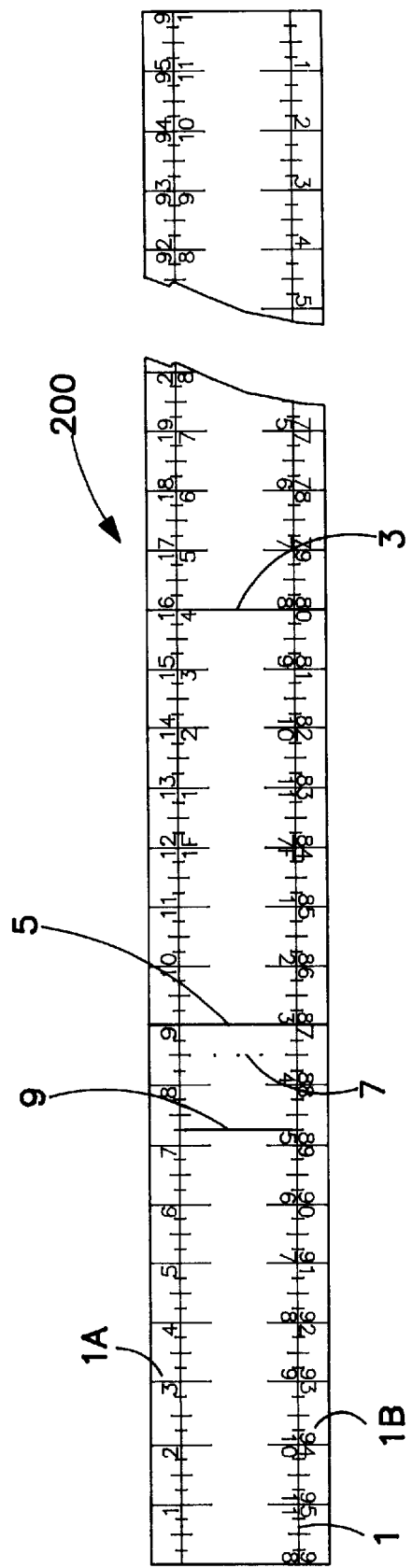
FIG. 2 illustrates a linear construction material bearing linear numerical measurement indicia on both edges of the same side and widthwise line indicia.

FIG. 2 illustrates linear construction material 200 with linear lengthwise numerical measurement indicia 1 with ascending indicia 1A and descending indicia 1B. Also stud line widthwise indicia 3 is demarked.

Preferably, linear construction material 200 also bears one inch line widthwise indicia 5, half inch line widthwise indicia 7 and quarter inch line widthwise indicia 9.

As can be appreciated by one of skill in the art, the indicia allows for ease of affixing sheet construction material 100 to a frame and for cutting of both sheet construction material 100 and linear cutting material 200.

Say for an example, a piece of 3 foot by 8 foot sheeting material is needed to be cut from a standard 4 foot by 8 foot sheet as shown in FIG. 1. The user just locates 3 feet measurement on 1A or 1B then just follows the line that connects the two measurements and cuts. If an L-shaped cut is needed that measure 3 feet by 7 feet on sheet material 100, the user locates 3 feet from either left or right, just follows the line and cuts at the measurement that was needed for the width. To get the length cut, find 7 feet mark on 2A or 2B and cut by following the line.

When there are other areas that have to be cut out such as lights, electrical outlets, pipes, windows and doors, a carpenter can just get one measurement, one corner of the outlet, then follow the desired measurement marks and lines then cut out what is needed from the certain standard outlet sizes.

After the pieces have been cut, it is ready to be nailed. Simply follow the stud line, in 3 or 4 and begin nailing. There will be times when the stud lines do not line up with the studs because some of the sheeting had to be cut out; however, there are lines that range as low as a quarter of an inch. No matter what was cut out, there will be guiding lines for the studs for the nails.

It will be understood that the claims are intended to cover all changes and modifications of the preferred embodiments of the invention herein chosen for the purpose of illustration which do not constitute a departure from the spirit and scope of the invention.

What I claim is:

1. Sheet construction material being rectangular in shape comprising:
    (a) a grid of line indicia positioned on said sheet construction material, said line indicia spaced ¼-inch apart and extending from one side to the opposite side of said sheet construction material, thereby forming ¼-inch squares on said sheet construction material;
    (b) a pair of linear numerical indicia positioned along each side of said sheet construction material and along each line indicia that corresponds to a stud line, each of said pair of linear numerical indicia comprising a consecutive ascending set of numerical indicia and a consecutive descending set of numerical indicia, said ascending and descending numerical indicia being in 1-inch increments; and
    (c) point indicia positioned on each stud line at every 4-inch increments.

2. The construction material of claim 1 further comprising stud line square center point indicia.

3. The construction material of claim 2 further comprising stud line square 8×4 point indicia, stud line square 12×8 point indicia, stud line square 8×12 point indicia and stud line square 4×12 point indicia.

4. The construction material of claim 1 wherein the sheet material is selected from the group consisting of plywood, drywall, sheetrock and plasterboard.

5. The construction material of claim 4 wherein said construction material measures 4'×8', 4'×10', 4'×12' or 4'×16'.

* * * * *